з,132,072
3α-(N,N-DIMETHYLAMINOACETOXY) - 20 - BIS-(NI-
TRATOMETHYL) - 21 - NITRATO-5β-PREGNANE-
11-ONE AND PROCESS FOR PRODUCTION
THEREOF
Daniel Bertin, Montrouge, and Lucien Nedelec, Clichy-
sous-Bois, France, assignors to Roussel-UCLAF, S.A.,
Paris, France, a corporation of France
No Drawing. Filed May 7, 1963, Ser. No. 278,745
Claims priority, application France May 16, 1962
14 Claims. (Cl. 167—65)

The invention relates to the novel compound, 3α-(N,N - dimethylaminoacetoxy) - 20 - bis-(nitratomethyl)-21-nitrato-5β-pregnane-11-one and its acid addition salts and to novel processes for the preparation of the said product. The invention also relates to novel spasmolytic compositions as well as to a novel method for treating vascular and coronary spasms.

3α - (N,N - dimethylaminoacetoxy)-20-bis-(nitratomethyl)-21-nitrato-5β-pregnane-11-one possesses interesting pharmacological properties, particularly vasodilatatory and spasmolytic action. It can be used for the treatment of angina pectoris and of coronaritis. It possesses particularly a spasmolytic action, a peripheral vasodilatatory action and antispasmodic effects which allows its use in bronchial spasms and visceral or vasculary spasms.

It is an object of the invention to provide the novel product, 3α - (N,N - dimethylaminoacetoxy-20-bis-(nitratomethyl)-21-nitrato-5β-pregnane-11-one and its acid addition salts.

It is another object of the invention to provide novel processes for the preparation of 3α-(N,N-dimethylaminoacetoxy)-20-bis-(nitratomethyl)-21-nitrato-5β - pregnane-11-one.

It is a further object of the invention to provide novel spasmolytic compositions.

It is an additional object of the invention to provide a novel method of treating vascular and coronary spasms.

These and other objects and advantages of the invention will become obvious from the following detailed description.

The novel product of the invention, 3α-(N,N-dimethylaminoacetoxy) - 20 - bis - (nitratomethyl)-21-nitrato-5β-pregnane-11-one, has the structural formula

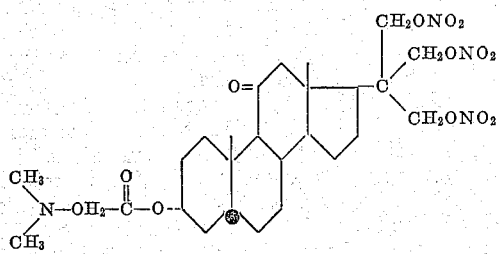

The acid addition salts of the said product can be derived from organic or inorganic acids, such as sulfuric acid, hydrochloric acid, citric acid, acetic acid, tartaric acid, etc. When the product is to be used in pharmaceutical compositions, the acid salt should be a non-toxic pharmaceutically acceptable acid addition salt.

One of the processes of the invention for the preparation of 3α-(N,N-dimethylaminoacetoxy)-20-bis-(nitratomethyl)-21-nitrato-5β-pregnane-11-one comprises condensing the hydrochloride of N,N-dimethyl glycyl chloride with 20-bis-(nitratomethyl)-21-nitrato-5β-pregnane-3α-ol-11-one, preferably in a solvent of chloroform containing pyridine, to form 3α - (N,N-dimethylaminoacetoxy)-20-bis-(nitratomethyl)-21-nitrato-5β-pregnane-11-one which can then be reacted with an inorganic or organic acid to form the corresponding acid addition salt, if desired.

For example, the hydrochloride salt can be prepared by reacting gaseous hydrogen chloride with the said product dissolved in a solvent in which the hydrochloride salt is insoluble, such as benzene. The reaction scheme is illustrated in Table I.

TABLE I

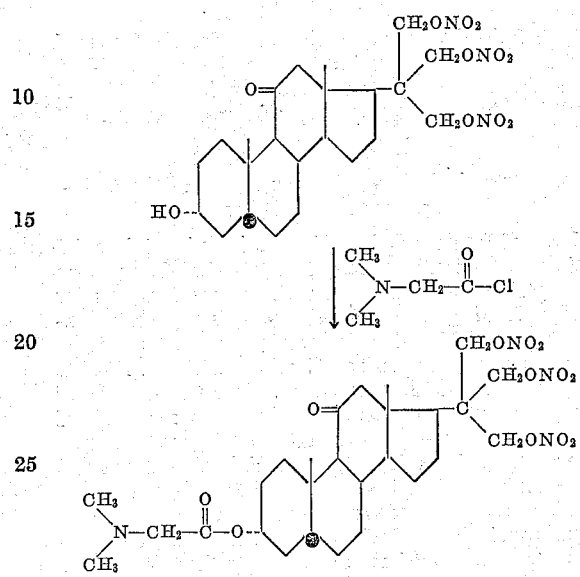

Another process for the preparation of 3α-(N,N-dimethylaminoacetoxy)-20-bis-(nitratomethyl) - 21 - nitrato-5β-pregnane-11-one which comprises esterifying the 20-bis-(hydroxymethyl) and 21-hydroxy groups of 20-bis-(hydroxymethyl)-5β-pregnane-3α,21-diol-11-one with a lower organic acid having 1 to 7 carbon atoms or easily saponifiable ortho acids, such as ethyl orthoformate, reacting the esterified compound with the hydrochloride of N,N-dimethyl glycyl chloride and then hydrolyzing the product to form 3α-(N,N-dimethylaminoacetoxy)-20-bis-(hydroxymethyl)-5β-pregnane-21-ol-11-one, and reacting the latter with fuming nitric acid to form 3α-(N,N-dimethylaminoacetoxy)-20-bis - (nitratomethyl)-21-nitrato-5β-pregnane-11-one.

The novel spasmolytic compositions of the invention are comprised of a compound selected from the group consisting of 3α-(N,N-dimethylaminoacetoxy)-20-bis-(nitratomethyl)-21-nitrato-5β-pregnane-11-one and its non-toxic, pharmaceutically acceptable acid addition salts and a major amount of an inert pharmaceutical carrier. The said compositions may be prepared in the form of injectable solutions or suspensions, prepared in ampules and multiple dose flacons or prepared in the form of tablets and suppositories in the usual manner.

The novel method of the invention for treating vascular and coronary spasms comprises administering an effective amount of a compound selected from the group consisting of 3α - (N,N - dimethylaminoacetoxy)-20-bis-(nitratomethyl)-21-nitrato-5β-pregnane - 11 - one and its non-toxic, pharmaceutically acceptable acid addition salts. The said compounds may be administered orally, transcutaneously or rectally. The usual daily dosage for an adult is from 20 to 100 mg. depending upon the method of administration.

In addition to being a useful therapeutic agent, 3α-(N,N-dimethylaminoacetoxy) - 20 - bis - (nitratomethyl)-21-nitrato-5β-pregnane-11-one can be used to form quaternary ammonium salts. For example, it can be reacted with methylchloride or methyliodide to form the corresponding chloro- or iodomethylate of 3α-(N,N-dimethylaminoacetoxy)-20-bis-(nitratomethyl) - 21 - nitrato-5β-pregnane-11-one.

20-bis-(nitratomethyl)-21-nitrato-5β-pregnane-3α-ol-11-one can be prepared according to the process disclosed in the commonly assigned, copending application Serial No. 174,692, filed February 21, 1962, now U.S. Patent No. 3,120,518, by reacting 3α-acetoxy-20-bis-(hydroxymethyl)-5β-pregnane-21-ol-11-one with fuming nitric acid to form 3α-acetoxy-20-bis-(nitratomethyl)-21-nitrato-5β-pregnane-11-one and saponifying the latter to form 20-bis-(nitratomethyl)-21-nitrato-5β-pregnane-3α-ol-11-one. The preparation of 20-bis-(hydroxymethyl)-5β-pregnane-3α,21-diol-11-one is also disclosed in the said application.

In the following examples there are described several preferred embodiments to illustrate the invention. However, it should be understood that the invention is not intended to be limited to the specific embodiments.

EXAMPLE I

*Preparation of 20-Bis-(Nitratomethyl)-21-Nitrato-5β-Pregnane-3α-Ol-11-One*

0.5 cc. of fuming nitric acid were introduced into 1.5 cc. of acetic acid anhydride cooled to −10° C. and then over a period of one minute, under nitrogen and under agitation, 0.058 gm. of 3α-acetoxy-20-bis-(hydroxymethyl)-5β-pregnane-21-ol-11-one, obtained according to the method described in patent application Serial No. 174,692 of February 21, 1962, were added. The temperature of the reaction mixture was maintained for a period of twenty minutes at −10° C., and then the reaction mixture was poured on ice. The precipitate was vacuum filtered and washed with water until the wash waters were neutral. The raw product was subjected to chromatography through silica gel with elution with methylene chloride containing 1% of acetone and was then crystallized by the addition of ethanol to obtain 0.056 gm. of 3α-acetoxy-20-bis-(nitratomethyl)-21-nitrato-5β-pregnane-11-one melting at 162–163° C.

The 3α-acetoxy-20-bis-(nitratomethyl)-21-nitrato-5β-pregnane-11-one was subjected to the action of ethanolic sodium hydroxide under an atmosphere of nitrogen and under agitation at room temperature to form 20-bis-(nitratomethyl)-21-nitrato-5β-pregnane-3α-ol-11-one which when purified by recrystallization from hot ethanol had a melting point of 110° C. and 174° C.

EXAMPLE II

*Preparation of 3α-(N,N-Dimethylaminoacetoxy)-20-Bis-(Nitratomethyl)-21-Nitrator-5β-Pregnane-11-One*

2.120 gm. of 20-bis-(nitratomethyl)-21-nitrato-5β-pregnane-3α-ol-11-one, 3.25 cc. of pyridine and 2.880 gm. of the hydrochloride of N,N-dimethylamino-glycyl were successively introduced into 42.5 cc. of chloroform and the reaction mixture was agitated for a period of an hour and thirty minutes at room temperature. After heating the mixture at reflux for a period of about an hour, the reaction mixture was cooled to 20° C. and poured into an aqueous solution containing 10% of sodium bicarbonate. After verification of the alkalinity, the mixture was extracted several times with chloroform. The combined extracts were washed successively with a 2% solution of sodium bicarbonate, saturated salt water and with water. The combined extracts were then dried over sodium sulfate and concentrated to dryness under vacuum to obtain 2.660 gm. of raw 3α-(N,N-dimethylaminoacetoxy)-20-bis-(nitratomethyl)-21-nitrato-5β-pregnane-11-one.

The said product was purified by subjecting it to chromatography through magnesium silicate with elutions with benzene containing 2% of methanol. 1.600 gm. of the chromatographed product were obtained which were taken up with boiling ethanol, then cooled to 0° C. and allowed to stand for crystallization. The crystals formed were vacuum filtered, washed with iced ethanol and dried. 1.400 gm. of purified 3α-(N,N-dimethylaminoacetoxy)-20-bis-(nitratomethyl)-21-nitrato-5β-pregnane-11-one melting at 173° C. and having a specific rotation $[\alpha]_D^{20} = +41.7° \mp 1°$ (c.=0.9% in chloroform) were obtained. A second lot of 0.040 gm. of product were obtained starting from the mother liquors of crystallization. Further purification was effected by solution in benzene, treatment with animal black and concentration to dryness under vacuum. The residue was taken up with boiling ethanol and crystallized from the cold.

The product occurred in the form of pale yellow hexagonal prisms and was soluble in acetone, benzene, chloroform and ethyl acetate, slightly soluble in alcohol and ether and insoluble in water.

*Analysis.*—$C_{27}H_{42}O_{12}N_4$: Molecular weight=614.64. Calculated: C, 52.76%; H, 6.89%; O, 31.24%; N, 9.11%. Found: C, 52.7%; H, 6.8%; O, 30.7%; N, 9.4.

This compound is not described in the literature.

Its infrared spectra in chloroform showed the absence of hydroxy groups and presence of Bands at 1,736 cm.$^{-1}$ (ester group)
Bands at 1,708 cm.$^{-1}$ (carbonyl group)
Bands at 1,654, 1,277 and 830–855 cm.$^{-1}$ (nitrato groups)
Bands at 2,780–2,832 cm.$^{-1}$ (substituted nitrogen)

The said product was easily transformed into the hydrochloride salt by dissolving 300 mg. of the product in 15 cc. of benzene and bubbling a current of dry gaseous hydrochloric acid through the solution until the solution was saturated. The solution was then concentrated to dryness at low temperatures under vacuum and the resin recovered was taken up with ether. The product was allowed to solidify and was then vacuum filtered, washed with ether and dried. 319 mg. of the hydrochloride of 3α-(N,N-dimethylaminoacetoxy)-20-bis-(nitratomethyl)-21-nitrato-5β-pregnane-11-one, having a melting point of about 150° C., were obtained.

The product occurred in the form of a colorless microcrystalline powder and was soluble in ethanol and chloroform, slightly soluble in water, dilute ethanol and benzene and insoluble in ether.

Calculated: Cl, 5.44%. Found: Cl, 5.4.

This compound is not described in the literature.

3α-(N,N-dimethylaminoacetoxy)-20-bis-(nitratomethyl)-21-nitrato-5β-pregnane-11-one was easily transformed by reaction with methyl iodide or methyl chloride into the corresponding halide of the methylate of 3α-(N,N-dimethylaminoacetoxy)-20-bis-(nitratomethyl)-21-nitrato-5β-pregnane-11-one.

PHARMACOLOGICAL DATA

A. *Coronary-dilatatory effect on the dog "in situ."*—The action of 3α-(dimethylaminoacetoxy)-20-bis-(nitratomethyl)-21-nitrato-5β-pregnane-11-one on the coronary blood flow was studied on a living dog anesthetized with Somnifene with opened thorax under artificial respiration. The coronary blood flow was registered by the thermostromuhr-de-rein while the compound was injected intraveneously at increasing doses in solution in glucose serum.

A dose of 200 γ/kg. provoked an increase of blood flow causing on the tracing a maximal deviation of 4.5 cm. at the end of one hour. A supplementary dose of 500 γ/kg. brought in the dog an increase of the blood flow at the end of about 60 to 70 minutes after the injection increasing on the tracing a maximal deviation of 1 to 2 cm. A dose of 1 mg./kg. provoked a new increase of blood flow and accentuated again the deviation on the tracing.

This effect on the coronary blood flow is shown thus to be durable and cumulative and the effect of successive doses appears to add thereto. In addition, 3α-(N,N-dimethylaminoacetoxy)-20-bis-(nitratomethyl)-21-nitrato-5β-pregnane-11-one does not possess an action on carotid pressure and does not provoke modification of responses to chemical moderators. In comparison, a dose of 1 mg./kg. of papaverine hydrochloride provoked only a transitory increase in blood flow at the moment of injection causing a deviation of only 0.5 cm. on the tracing.

B. *Influence on the oxygenation of coronary venous blood.*—In that the beneficial effect of coronary dilatators does not result purely and simply from the increase of coronary blood flow, it is important to know the direct action of 3α - (N,N-dimethylaminoacetoxy) - 20 - bis-(nitratomethyl)-21-nitrato-5β-pregnane-11-one on the cardiac muscle which causes a decrease of the consumption of oxygen by the myocardium and consequently an increase in the amount of oxygen in the sinusal venous blood. This increase reflects the improvement of yield of myocardium.

In the anesthesized animal having an open thorax, being kept under artificial respiration and whose blood was rendered previously incoagulable by the injection of heparine, there was introduced into a coronary vein a catheter of polyethylene allowing the repeated sampling of blood of the coronary venous blood by opening and "clamping" on demand. This blood was recovered in the absence of air under a bed of Vaseline oil.

The amount of oxygen in the samples of coronary venous blood separated at diverse intervals of time after injection of 3α - (N,N - dimethylaminoacetoxy) - 20 - bis-(nitratomethyl)-21-nitrato-5β-pregnane-11-one by venous methods was determined according to a spectrophotometric method inspired by that of Schalter et al., J. Lab. Clin. Med., 1945, 30, 84, and Procedures for Spectrophotometric Chemistry Standard Scient. Sup. Corp. (New York, 1959). Table II summarizes the results obtained on the dog at doses of 500 γ/kg. and 1 mg./kg.

TABLE II

| Time of Sampling After Injection | Amount of Oxygen in the Blood Expressed in venous volume percent | |
|---|---|---|
| | 500 γ/kg. | 1,000 γ/kg. |
| 0 | 10.28 | 8.08 |
| 8 mn | 12.20 | |
| 20 mn | 12.05 | 8.37 |
| 30 mn | 13.16 | 8.88 |
| 45 mn | 11.88 | |
| 60 mn | 13.10 | 8.62 |
| 80 mn | 11.72 | 9.58 |

As can be seen from Table II, the action of 3α-(N,N-dimethylaminoacetoxy) - 20 - bis - (nitratomethyl) - 21 - nitrato-5β-pregnane-11-one is remarkably durable.

C. *Action on coronary blood flow of the isolated rabbit heart.*—A young rabbit heart, previously heparinated, isolated and mounted at the end of a canula was perfused with blood taken from the carotide of a second anesthetized animal, into which it is re-injected at constant blood flow in the saphenous vein by the intermediary of a Jouvelet perfusor apparatus. The blood streaming out of the isolated heart fell dropwise into a funnel made of non-adherent material, joined at the roller of a Marey register. Each drop which fell into the funnel was inscribed on the cylinder by vertical stroke. The comparison of the number of strokes in a unit of time before and after the injection of 3α-(N,N-dimethylaminoacetoxy) - 20 - bis - (nitratomethyl) - 21 - nitrato-5β-pregnane-11-one permitted the measurement of variations of coronary blood flow caused by this injection.

The medicinal solution containing 5 mg./cc. in glucose serum was injected into the saphenous vein of the donor animal. The coronary dilatory effect of the medicine was studied in this test after intoxication of the isolated heart by a suitable dose of barium chloride (in general 3 mg./kg.).

With a dose of 500 γ/kg. of the product, the frequency of the drops passed from 65 to 73 per minute at the end of five minutes. It was still 72 per minute at the end of fifteen minutes. The increase in coronary blood flow is thus 13% at the end of 15 minutes. With a dose of 1 mg./kg., the frequency of drops increased from 69 to 76 at the end of two minutes and it increased to 79 at the end of 30 minutes. The increase of coronary blood flow is thus 14% at the end of thirty minutes.

The said doses augmented the duration of the activity of the product but not the intensity of its activity.

D. *Effect on the peripheric circulation.*—The effects of 3α - (N,N-dimethylaminoacetoxy) - 20 - bis - (nitratomethyl) - 21 - nitrato - 5β - pregnane - 11 -one on the peripheric circulation were shown by the method of the isolated paw of the rabbit "in situ" following the technique inspired by that of Binet and Burstein (Presse Medical, 1949, p. 445). A violent increase of the arterial pressure in the paw was realized by a sudden increase of blood flow perfused by the Jouvelet apparatus. Under these conditions at a dose of 200 γ/kg. of the product, a progressive vasodilatation was shown attaining a lowering of 2 cm. of pressure on the tracing at the end of about thirty minutes. At a dose of 500 γ/kg., the tests showed a lowering of the pressure which was durable and stable.

E. *Effects on the general circulation and organs.*—3α-(N,N-dimethylaminoacetoxy) - 20 - bis - (nitratomethyl)-21-nitrato-5β-pregnane-11-one was injected by venous methods into dogs anesthetized with Sommifene. The carotide pressure and the respiratory rhythm were registered simultaneously. Doses of 500γ, 1 mg., 2 mg. and 5 mg./kg. of the medicine provoked a very slight hypotension appreciable only for the strongest dose where it is most durable.

At a dose of 10 mg./kg., a stable and durable hypotensor effect appeared in several minutes. One such dose also caused a diminution of the sensitivity to acetylcholine and to histamine. There appeared parallelly a depressor effect on the respiratory rhythm attaining in several minutes 25% of the normal value.

Various modifications of the process and method of the invention may be made without departing from the spirit or scope thereof, and it is to be understood that the invention is intended to be limited only as defined in the appended claims.

We claim:
1. A compound selected from the group consisting of 3α - (N,N - dimethylaminoacetoxy) - 20 - bis - (nitratomethyl-21-nitrato-5β-pregnane-11-one and its acid addition salts.

2. 3α - (N,N -dimethylaminoacetoxy) - 20 - bis - (nitratomethyl)-21-nitrato-5β-pregnane-11-one.

3. The hydrochloride of 3α-(N,N-dimethylaminoacetoxy) - 20 - bis - (nitratomethyl) - 21 - nitrato - 5β - pregnane-11-one.

4. A process for the preparation of 3α-(N,N-dimethylaminoacetoxy) - 20 - bis - (nitratomethyl) - 21 - nitrato-5β-pregnane-11-one which comprises reacting 20-bis-(nitratomethyl) - 21 - nitrato - 5β - pregnane - 3α - ol-11-one with the hydrochloride of N,N-dimethylglycyl chloride to form 3α-(N,N-dimethylaminoacetoxy)-20-bis-(nitratomethyl)-21-nitrato-5β-pregnane-11-one.

5. The process of claim 4 wherein the said reaction is effected in a mixture of chloroform and pyridine.

6. The process of claim 4 wherein 3α-(N,N-dimethylaminoacetoxy) - 20 - bis - (nitratomethyl) - 21 - nitrato-5β-pregnane-11-one is reacted with gaseous hydrogen chloride in benzene to form the hydrochloride of 3α-(N,N - dimethylaminoacetoxy) - 20 - bis - (nitratomethyl)-21-nitrato-5β-pregnane-11-one.

7. A process for the preparation of 3α-(N,N-dimethylaminoacetoxy) - 20 - bis - (nitratomethyl) - 21 - nitrato-5β-pregnane-11-one which comprises esterifying the 20-bis-(hydroxymethyl) and 21-hydroxy groups of 20-bis-hydroxymethyl)-5β-pregnane-3α,21-diol-11-one with a member selected from the group consisting of a lower organic acid having 1 to 7 carbon atoms and an easily saponifiable ortho acid, reacting the said product with the hydrochloride of N,N-dimethylglycyl chloride and hydrolyzing the resulting product to form 3α-(N,N-dimethylaminoacetoxy) - 20 - bis - (hydroxymethyl) - 5β - pregnane-21-ol-11-one and reacting the latter with fuming nitric acid to form 3α-(N,N-dimethylaminoacetoxy)-20-bis-(nitratomethyl)-21-nitrato-5β-pregnane-11-one.

8. Spasmolytic compositions comprising a pregnane selected from the group consisting of 3α-(N,N-dimethylaminoacetoxy) - 20 - bis - (nitratomethyl) - 21 -nitrato-5β-pregnane-11-one and its non-toxic, pharmaceutically acceptable acid addition salts and a major amount of an inert pharmaceutical carrier.

9. The compositions of claim 8 wherein the pregnane is 3α - (N,N - dimethylaminoacetoxy) - 20 - bis - (nitratomethyl)-21-nitrato-5β-pregnane-11-one.

10. The compositions of claim 8 wherein the pregnane is the hydrochloride of 3α-(N,N-dimethylaminoacetoxy)-20-bis-(nitratomethyl)-21-nitrato-5β-pregnane-11-one.

11. A method of treating vascular and coronary spasms which comprises administering an effective amount of a pregnane selected from the group consisting of 3α-(N,N-dimethylaminoacetoxy) - 20 - bis - (nitratomethyl) - 21-nitrato-5β-pregnane-11-one and its non-toxic pharmaceutically acceptable acid addition salts.

12. The method of claim 11 wherein the said pregnane is 3α - (N,N -dimethylaminoacetoxy) - 20 - bis - (nitratomethyl)-21-nitrato-5β-pregnane-11-one.

13. The method of claim 11 wherein the said pregnane is the hydrochloride of 3α-(N,N-dimethylaminoacetoxy)-20-bis-(nitratomethyl-21-nitrato-5β-pregnane-11-one.

14. The method of claim 11 wherein the effective amount is a daily dose of 20 to 100 mg. in the adult.

No references cited.

UNITED STATES PATENT OFFICE
CERTIFICATE OF CORRECTION

Patent No. 3,132,072                                            May 5, 1964

David Bertin et al.

It is hereby certified that error appears in the above numbered patent requiring correction and that the said Letters Patent should read as corrected below.

Column 3, line 48, for "-21-Nitrator-", in italics, read -- -21-Nitrato- --, in italics; line 51, after "-glycyl" insert -- chloride --; column 8, line 12, for "(nitratomethyl- read -- (nitratomethyl)- --.

Signed and sealed this 5th day of January 1965.

(SEAL)
Attest:

ERNEST W. SWIDER                                   EDWARD J. BRENNER
Attesting Officer                                      Commissioner of Patents